United States Patent [19]

Pandelisev

[11] Patent Number: 5,614,721
[45] Date of Patent: Mar. 25, 1997

[54] MODULAR GAMMA CAMERA PLATE ASSEMBLY WITH ENHANCED ENERGY DETECTION AND RESOLUTION

[75] Inventor: Kiril A. Pandelisev, Mesa, Ariz.

[73] Assignee: Optoscint, Inc., Scottsdale, Ariz.

[21] Appl. No.: 572,173

[22] Filed: Dec. 13, 1995

[51] Int. Cl.⁶ .................................................. G01T 1/202
[52] U.S. Cl. ............................................ 250/368; 250/366
[58] Field of Search ...................................... 250/368, 366

[56] References Cited

U.S. PATENT DOCUMENTS

| | | |
|---|---|---|
| T910,007 | 5/1973 | Suscheck et al. ..................... 250/368 |
| 2,853,621 | 9/1958 | Ruderman . |
| 3,784,819 | 1/1974 | Martone et al. . |
| 4,029,964 | 6/1977 | Ashe . |
| 4,267,453 | 5/1981 | Kieboom et al. . |
| 4,280,051 | 7/1981 | Engdahl et al. . |
| 4,631,409 | 12/1986 | Sparacia et al. . |
| 4,658,141 | 4/1987 | Wilt et al. . |
| 4,720,426 | 1/1988 | Englert et al. . |
| 5,132,539 | 7/1992 | Kwasnick et al. . |
| 5,148,029 | 9/1992 | Persyk et al. . |
| 5,179,284 | 1/1993 | Kingsley et al. . |
| 5,229,613 | 7/1993 | Pandelisev et al. . |
| 5,237,179 | 8/1993 | Williams et al. . |

*Primary Examiner*—Constantine Hannaher
*Attorney, Agent, or Firm*—James Creighton Wray

[57] ABSTRACT

A modular gamma camera plate assembly has a mirror peripherally supported in an encircling housing. The holder is connected to the mirror and to the housing. A thin glass plate is mounted beneath the crystal and extends outward and is connected to the housing. A thin mirror extends above the crystal and is connected peripherally to the housing. The thin glass plate assembly and the mirror are sealed to the housing and pockets with desiccant are provided to prevent ingress of moisture and to getter moisture from the housing and assembly.

45 Claims, 4 Drawing Sheets

MODULAR GAMMA CAMERA PLATE ASSEMBLY WITH ENHANCED ENERGY DETECTION AND RESOLUTION

BACKGROUND OF THE INVENTION

This invention relates to various methods of fabrication of gamma camera plate assemblies having one or more crystals and with improved energy resolution.

A gamma camera plate assembly made by using the prior art process consists of a thick glass plate that serves as carrier for the crystal. The crystal is coupled to the glass plate using an optical cement, a hydroformed aluminum pan that houses the crystal and the glass and a steel or aluminum flange that houses the pan with the crystal and the glass. The thickness of the glass plate has to be capable to carry the crystal. Glass plates having excellent homogeneity, parallel planes and polished on both sides, over half an inch thick are used commonly. The homogeneity of the glass is of extreme importance to eliminate non-even absorption, light scattering, diffraction and loss due to total reflection in the glass plate. Also, a glass plate of thickness and dimensions slightly larger in respect to the crystal is rather heavy. The thickness of the glass plate causes the distance between the crystal and the photomultipliers not to be at its optimum, thus causing degradation in the energy resolution. To prevent sliding and other plate movements the optical cement is of a rather permanent nature, and any plate assembly repair (usually re-polishing of the back side of the crystal exposed to degradation) is either nearly impossible or very difficult even for very skilled persons.

SUMMARY OF THE INVENTION

The current invention has several advantages. The invention provides fabrication of a gamma camera plate assembly that has improved reflection all around the crystal. The invention provides prevention of any moisture degradation by sealing the crystal. The invention provides moisture traps at all possible places that moisture may get in. The invention introduces an extremely thin glass plate that is carried by the crystal housing. The invention reduces to very minimum the light absorption and light scattering centers in the glass plate. The new gamma camera plate eliminates the need for an optically parallel polished glass plate. It provides for use of thin, low energy absorption gamma ray windows. Fabrication of new gamma camera plate assemblies are modular in character. The optical coupling between the glass and the crystal does not have to be of a permanent nature, and the crystal plate or glass plate replacement can be done very easy and cost effectively.

The invention also introduces constructions with high quality specular or diffuse reflectors in ways that do not degrade the polished crystal surface.

The present invention can be characterized as methods for fabrication of gamma camera plate assemblies with improved reflector systems, improved energy resolution, long lifetimes, and easy to make modular fabrication.

A preferred gamma camera plate assembly includes a crystal having at least one cladding surrounding the crystal and a mirror surrounding the cladding. A peripheral housing has a holder mounted between the crystal and the housing for supporting the crystal in the housing. The holder and the housing have mutually engaging surface features for supporting the holder against movement in the housing. Preferred mutual engaging features comprise a downward and inward sloped internal wall in the housing and a complementary upward and outward sloped outer wall on the holder. Projections extend transverse to the surfaces for inter-engaging the surfaces and preventing relative sliding of the surfaces.

In one form, the inter-engaging features are protrusions extending outward from the outer wall of the holder and complementary recesses in the inner wall of the housing.

In one embodiment an inward facing recess is formed in the holder. A complementary outward extension on the mirror is positioned in the inward facing recess in the holder for preventing relative movement of the holder and mirror.

A shelf at the bottom of the holder extends inward beneath the crystal and supports the crystal with respect to the holder.

In one embodiment a shelf extends inward from the holder, holder and beneath the crystal for supporting the crystal on the shelf. One shelf positioned below a peripheral portion of the crystal and extending inward from the housing and holder has fasteners for connecting the shelf to the holder or housing.

The invention has a thin glass plate and a connector for connecting a peripheral portion of the thin glass plate to the housing and for supporting the thin glass plate from the housing. One embodiment includes a glass-to-metal seal or epoxy connecting a peripheral area of the thin glass plate to the housing.

An inward cantilevered support connected to an outward portion of the housing and extending inward beneath a peripheral portion of the thin glass plate supports the thin glass plate. The cantilevered support is an annular support extending around the entire peripheral area of the housing. A mechanical attachment mechanically attaches the cantilevered support to the housing.

First and second desiccant pockets are positioned adjacent the seal and spaced radially inward and radially outward with respect to each other. Desiccant is disposed in the pockets for preventing ingress of moisture from without the gamma camera plate assembly and for gettering moisture in the gamma camera plate assembly during fabrication thereof.

In one embodiment an L-shaped ring surrounds an edge of the thin glass plate and underlies a peripheral portion of the lower surface of the thin glass plate. A glass-to-metal seal of epoxy between the peripheral portion and the edge of the thin glass plate and the L-shaped ring seals the L-shaped ring to the thin glass plate.

Epoxy connects an outer ring to an outer surface of the L-shaped ring. Epoxy connects the outer ring to an inward facing wall in the housing. A third area of epoxy connects an upper peripheral surface of the thin glass plate to a lower surface of the housing. Pockets with desiccant disposed therein are between the third area of epoxy in a recess in the housing inward of the third layer of epoxy and between the third layer of epoxy and the glass-to-metal seal or epoxy, and between the first layer of epoxy and the housing.

A metal support ring underlies the outer ring, the second layer of epoxy and the housing, and is mechanically attached to the housing for supporting the outer ring and thereby supporting the L-shaped ring and the thin glass plate on the housing.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
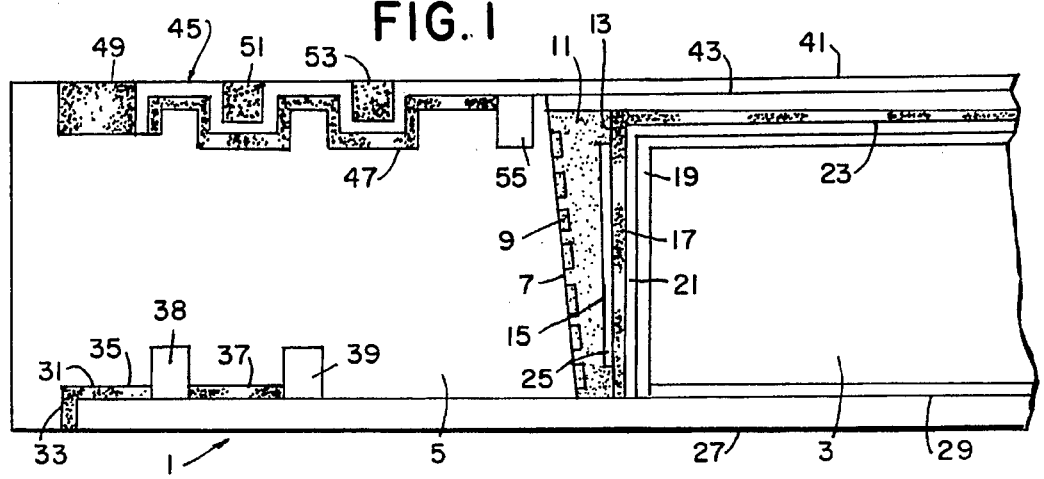
FIG. 1 shows a cross-sectional edge view of a gamma camera plate assembly for enhanced energy detection and resolution using a peripheral supporting structure for a crystal, epoxy sealing and a thin glass plate.

Referring to FIG. 1, a modular camera plate assembly with an enhanced energy detection resolution is generally referred to by the numeral 1. A crystal 3 is supported peripherally by a housing 5. The housing 5 has a tapered inner wall 7 with projections 9 which extend into recesses in a tapered support 11. The projections may be integral with the tapered support and may extend into complementary recesses in the sloping inner wall 7 of the housing. The tapered support 11 has a flat inner wall 13 which is flat, or recess 15, which surrounds a mirror 17, which in turn surrounds the multi-layered cladding 19 and 21 surrounding the crystal 3.

As shown in FIG. 1, the mirror 17 continues around the crystal to overlie the crystal. However, the horizontal portion 23 of the mirror may be eliminated in one modification of the invention.

As further shown in FIG. 1, the mirror has a projection 25 which fits within the complementary recess 15 in the inner wall 13 of the tapered support 11 to further interlock the crystal plate in the tapered support, which is held in the housing 5. Because the crystal plate is supported peripherally in the tapered support 11 and the housing 5, the glass plate 27 which underlies the crystal may be a thin glass plate which need not be a load supporting plate. The thinness of the glass provides better energy resolution by bringing the crystal 3 closer to the photomultiplier tube which is positioned outside and adjacent the glass plate. Thinness of the glass plate provides less light scattering, less light absorption, less weight and less cost because of supporting the crystal peripherally and not using the glass plate as a carrier for the crystal. Intermediate the thin glass plate 27 and the crystal 3 is an optical coupler 29. The optical coupler 29 may be a clear elastomer which is directly coupled to the crystal 3 and the glass plate 27, or which is coupled to the crystal and glass plate with vacuum grease.

As shown in FIG. 1, the outer edge of the glass plate is surrounded and the peripheral portion of the glass plate is overlaid by an epoxy or glass-to-metal seal 31, which has a radially outward portion 33, an outer flat portion 35 and an inner portion 37. Two desiccant pockets 38 and 39 are positioned on the inner edges of the sealed portions 35 and 37.

A low absorption gamma ray window 41 overlies the assembly and is connected to the flat surface 23 of the mirror or the upper cladding 21 by a clear elastomeric optical coupler 43. The outer edge portion 45 of the gamma ray window 41 is peripherally channel formed and is interiorly joined with the housing 5 using an epoxy 47 or a metal-to-metal bond or other type of bonding material.

Recesses 49 around and within the channels of the peripheral portion 45 of the gamma ray window 41 are filled with filler material which may be an elastomer or rubber-type material. A pocket 55 along the innermost portion of the seal 47 is filled with desiccant to prevent moisture accumulation or inward moisture egress, or to getter any moisture present in the assembly procedure.

As shown in FIG. 1, the protrusions 9 may be posts or rings which protrude into the tapered mounting support 11. The protrusions 9 may be fixed on the tapered surface 7, may be rings which extend into recesses in the tapered surface 7, or may be threads which are formed on the tapered surface 7, or it can be a jagged or roughened surface of the tapered surface 7 so that the tapered support 11 and tapered surface 7 are locked together.

The mirror 17 may be a dielectric mirror or a metal mirror and may be a specular or diffusion mirror, and may be an epoxy filled with diffuse reflector material.

The housing may be made of a metal such as stainless steel or other alloy or aluminum, or of a hard composite material with a fibrous matrix for light weight and strength.

The epoxy or glass-to-metal seal may be preferably formed by first doping the peripheral sealing portion of the thin glass plate with one of the components of or a component highly affinitive to the glass-to-metal seal, and then forming the glass-to-metal seal with some alloys such as indium-based alloys and tightly bonding the glass-to-metal seal with the thin glass plate and the rigid housing.

The epoxy 47 may be a suitable epoxy with a desired coefficient of expansion which has excellent bonding characteristics with the material of the gamma ray window 41 and the housing 5. The epoxies usually are purchased from Master Bond or Dow Corning or other similar companies and are particularly suited for aluminum-to-aluminum sealing, aluminum-to-stainless steel sealing, beryllium to aluminum, stainless steel or metal alloy sealing, or sealing the aluminum, beryllium or other gamma ray window material to a composite housing 5.

The filler material may be any convenient elastomer which bonds well with the housing or with the housing and the gamma ray window material.

The desiccant may be any suitable desiccant, preferably in solid form, usually in a form of pellets, granules or powder, which is capable of drawing in and entrapping moisture.

In the succeeding figures, similar elements have similar numbers.

Figure 2:
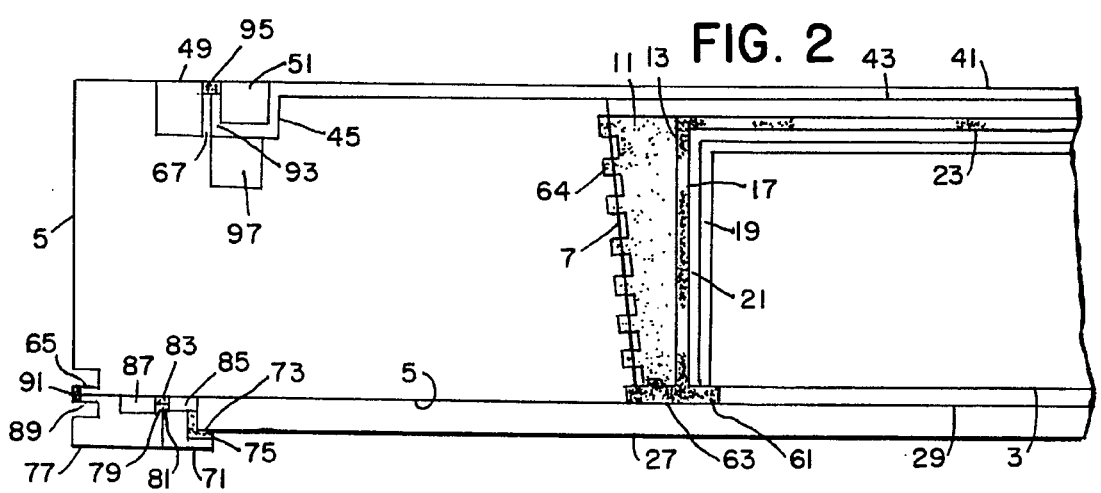
FIG. 2 shows a crystal peripheral supporting structure with a thin glass plate for a gamma camera plate assembly having thin ring welded seals.

FIG. 2 shows a peripheral support ring 61 which underlies a peripheral portion of the crystal 3 and which is either integrally formed with the tapered support 11 or which is an integral extension at the inner bottom of the housing 5. Alternatively, the ring support 61 may be bolted with set screws 63 to the tapered support 11 for supporting the ring and the crystal 3 on the tapered support and on the housing 5. Projections 64 on the tapered support 11 fit into complementary recesses in the sloping wall 7.

The housing 5 is formed with peripheral rings 65 and 67 for welding. Initially a generally L-shaped ring 71 is sealed to outer and lower outer edges 73 of the thin glass plate 27.

A glass-to-metal seal 75 is formed between the ring 71 and the outer peripheral edge portion 73 of the glass plate 27 after first doping the peripheral edge portion 73 with a component of the glass-to-metal seal. The glass-to-metal seal 75 may be replaced with an epoxy which is suitable for joining the metal ring 71 with the thin glass plate 27. An outer ring 77 has a thin inner portion 79 which is juxtaposed with a thin outer portion 81 of the inner ring 71, and the two rings are welded 83. The weld of the thin rings 79 and 81 prevents heat from migrating to the outer peripheral portion of the thin glass plate 27 and protects the thin glass plate from the heat of welding.

Two desiccant pockets 85 and 87 receive desiccant granules before the glass plate and ring subassembly is connected to the housing 5.

The outer ring 77 has a thin outer extension 89 which is tip welded 91 to the extended ring 65 on the housing 5 after the rings are assembled to the thin glass plate 27 and after desiccant is disposed in the pockets 85 and 87.

The gamma ray window 41 has a peripheral channeled area 45 which terminates in an outward extended portion 93, which is welded 95 to the upward extending thin ring 97 of the housing.

The recesses 49 and 51 are filled with elastomer. Pocket 97 is at least partially filled with a desiccant.

The peripheral portion of housing 5 which extends outward beyond the elastomer-filled recesses 49 and a complementary portion of the outer ring 77 may be drilled for fasteners to connect the gamma camera crystal plate assembly to a gamma camera.

The crystal supporting extension 61 may be employed in the structures shown in FIG. 1 and in other figures.

Figure 3:
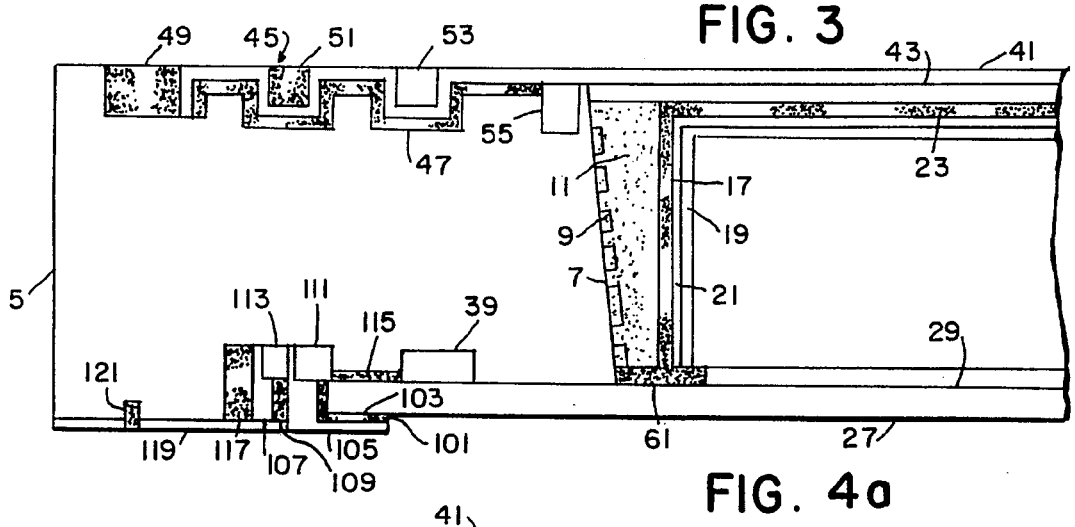
FIG. 3 is a cross-sectional edge detail of a gamma camera plate assembly with a peripheral support for a crystal, a thin glass plate and multiple epoxy ring seals.

With reference to FIG. 3, the tapered support 11 may be formed with or without the support shelf 61. The upper structure is similar to the structure shown in FIG. 1. The structure for joining the thin glass plate 27 to the housing 5 first uses an L-shaped glass-to-metal seal 101 to join a corner 103 of the thin glass plate 27 to an L-shaped metal plate 105.

In a second step, the metal plate 105 is secured to a ring 107 with epoxy 109. In a third step, desiccant pellets are placed within the pockets 39, 111 and 113, and a layer of epoxy 115 is added between the plate 27 and the pockets 39 and 111 and the housing 5, and another layer of epoxy 117 is added between the ring 107 and the housing 5. In the next step, an additional plate 119 is connected to cover the epoxy seals 109 and 117 and the plate 107, and set screws 121 connect the plate 119 to the housing 5.

In all of the cases shown in FIGS. 1–3, the area of the gamma ray window 41 which extends over the crystal 3 may be relatively thin with respect to the peripheral area 45, which is used to seal the gamma ray window to the mounting housing 5. That is done to optimize the penetration of low energy gamma rays through the thin window into the crystal.

Figure 4A:
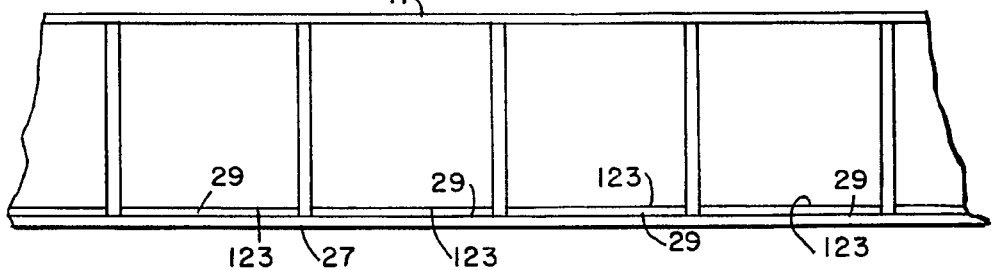
FIGS. 4A and 4B are vertical and horizontal sections of modular multi-crystal gamma camera plates.
Figure 4B:
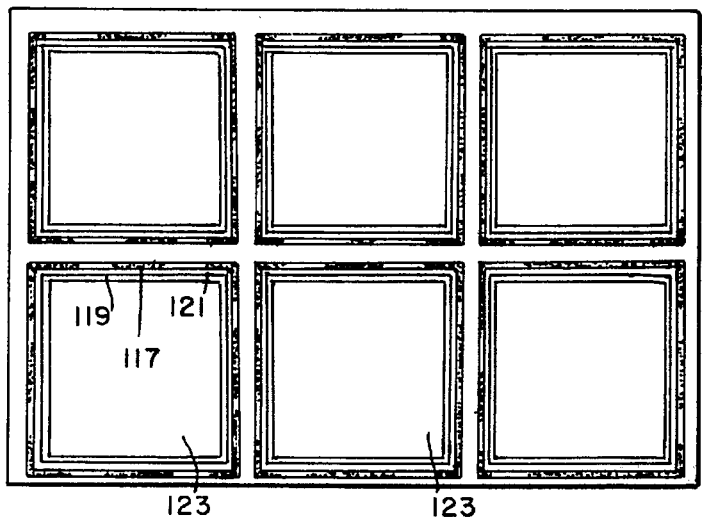

As shown in the vertical and horizontal sections of FIGS. 4A and 4B, the crystal 3 may be replaced with multiple crystals 123. A frame 125 with apertures 127 surrounds the crystals. The crystals 123 are surrounded by one more cladding layers 119, 121 and mirror 117.

Figure 7:
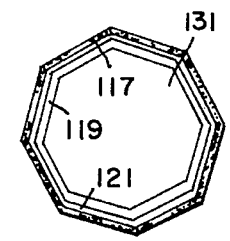
FIGS. 5, 6 and 7 are bottom views of differing forms of crystals used in the modular multi-crystal gamma camera plate assembly.
Figure 6:
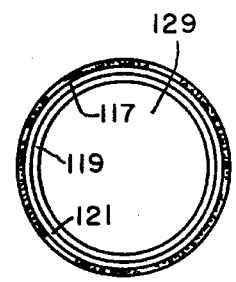
Figure 5:
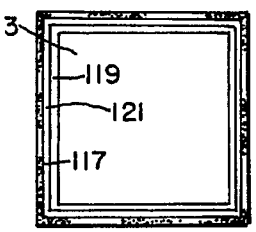

As shown in FIGS. 5, 6 and 7, the crystal 123 may be in rectangular form or in the cylindrical form 129 or in other polygonal form 131. In any of the cases, the crystals are surrounded by a similarly shaped mirror 117 and one or more cladding layers 119, 121.

Figure 8:
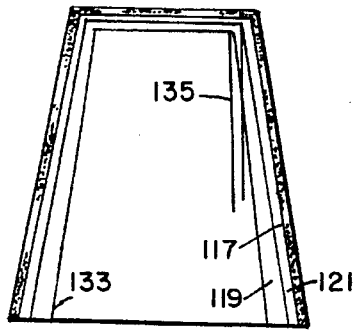
FIG. 8 is a cross-section side detail of a crystal, cladding and reflector used in a modular assembly which has a horizontal cross-section similar to the crystals shown in FIGS. 5, 6 and 7, with a polygonal or round shape.

As shown in FIG. 8, the crystals may have side walls 133 which slope with respect to vertical lines 135. Mirrors 117 and cladding 119 and 121 may be similarly shaped. As shown in FIG. 8, the cladding 119 is thicker near the bottom than near the top. The particular shape of the crystals shown in FIG. 8 and the cladding shown therein aid in the reduction of the path lengths of light energy through the crystal to minimize the optical paths of photons through the crystal after they are created by scintillation events, which are collisions of gamma rays with dopant centers within the crystal. For example the crystals may be sodium iodide crystals doped with thallium, forming thallium dopant centers throughout the crystal as gamma sensitive sites which produce photons upon impact by gamma rays.

The crystals shown in FIGS. 4A and 4B are sealed peripherally within a large housing which extends around all of the assembled crystals. Backing is provided between the crystals to support the mirrors 117, but the sealing shown in the other drawings is not provided between the individual crystals in a preferred embodiment of the invention. Instead, the peripheral sealing is provided around the entire assembly of crystals in a housing which peripherally extends from the entire assembly of crystals. It is the peripherally extending housing which is mounted directly to the gamma camera.

As in FIG. 1, the mirror 17 may overlie the top of the crystal or the mirror 17 may simply overlie the sides of the crystal.

Figure 9:
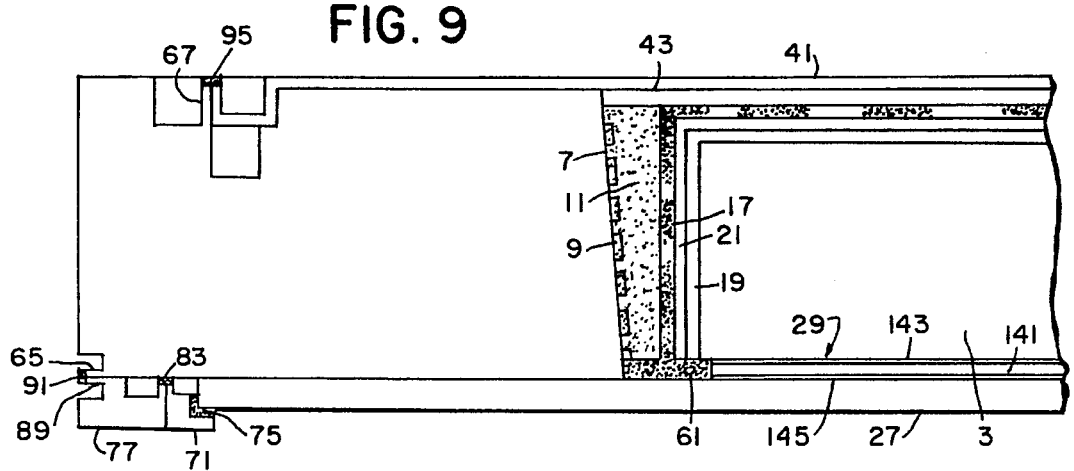
FIG. 9 is an enlarged cross-sectional edge detail of a modular unit showing thin ring welds in a housing with peripheral support for crystals and a thin glass plate elastomer and vacuum grease.

A modular optical coupling 29 is shown in FIG. 9. An elastomer layer 141 between the thin glass plate 27 and the crystal 3 is coupled via thin layers 143 and 145 of vacuum grease or similar material. The vacuum grease acts like a glue and provides intimate contact between the surfaces without voids, bubbles or inclusions of gas, solids or vapors.

The cladding 19 and 21 may be made of discontinuous sheets where the joints 147 and 149 are formed at the top. The cladding sheets 19 and 21 may be connected with the crystal 3, with themselves or with the mirror using vacuum grease or similar material.

The mirror 17 can also be of a modular nature with the side portions connected to the upper portion 23. The sheet 43 may be an elastomer which is coupled with the gamma ray window 41 and the mirror 17 using vacuum grease or similar material. The ring 61 can be secured 63 to the bottom of the tapered support 11 such as by integral construction or bonding or integral construction with the housing 5.

Figure 10:
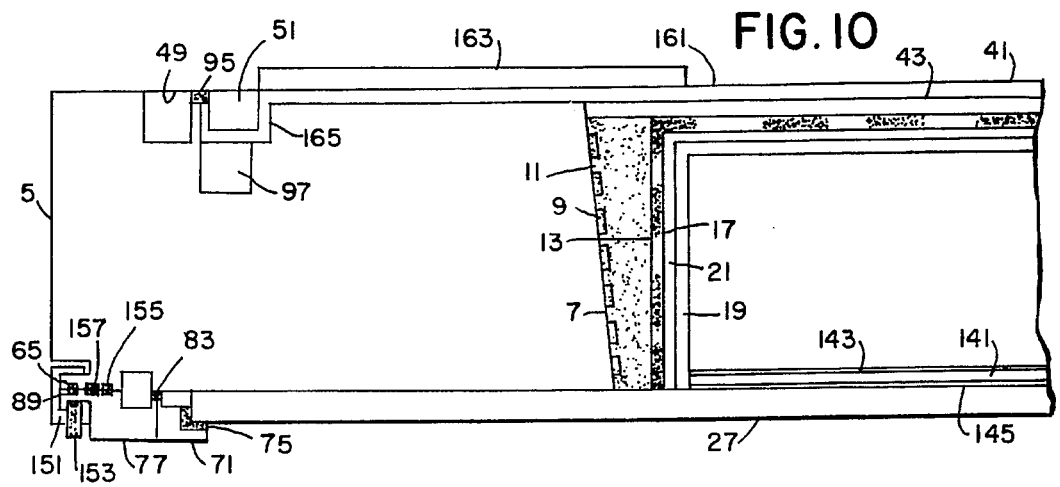
FIG. 10 is an edge view cross-sectional detail of a modular housing for a gamma camera plate assembly having a thin gamma ray window with a housing clamp and elastomer rings for supporting a thin glass plate on the housing.

As shown in FIG. 10, the thin glass plate 27 may be joined to the housing 5 using a clamp 151 with a screw 153, which may clamp the narrow projections 65 on the housing and 89 on the peripheral ring 77. Recesses 155 are filled with elastomeric rings 157 to seal the interface between the thin glass plate 27 and the housing 5.

As shown in FIGS. 9 and 2, the peripheral mounting rings 71 and 77 are welded 83 after the inner ring 71 is connected to a peripheral area of the thin glass plate 27 with the glass-to-metal seal or epoxy 75. The pockets 85 and 87 receive desiccant granules before the clamps secure the glass plate mounting rings of the glass plate subassembly to the housing. Clamps 151 compress the elastomer rings 157 within the recesses 155 and seal the glass plate 27 in the subassembly to the housing 5.

The gamma ray window 41 has a thin window portion 161 and a relatively thick peripheral portion 163 in which the mounting channel 165 is formed.

Figure 11:
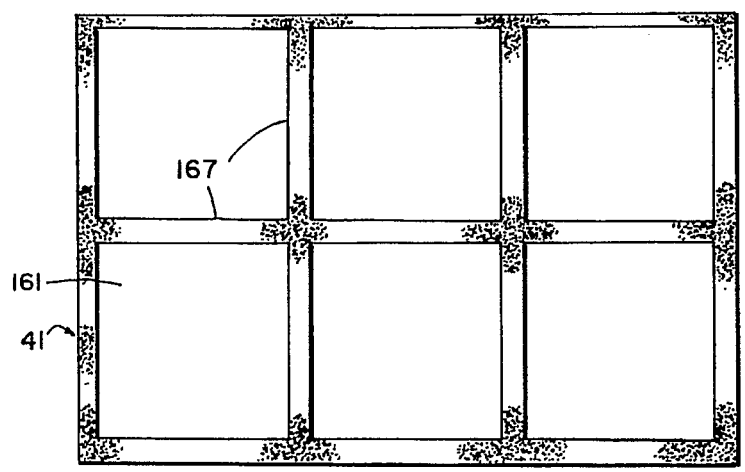
FIG. 11 is a plan view of a gamma ray window for a multi-crystal plate assembly.
Figure 12:
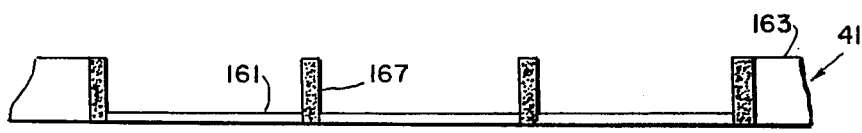
FIG. 12 is a cross-sectional elevational view of the gamma ray window assembly shown in FIG. 11.

Referring to FIGS. 11 and 12, thin window areas 161 of the gamma ray window 41 are surrounded by thick portions 167 which frame the thin portions 141 and provide reinforcement of the thin portions. The thick frame portions 167 have a thickness substantially equal to the thickness of the peripheral portion 163. The thickness of the frame elements 167 may be of any thickness with respect to the peripheral portion 163. When the gamma ray window shown in FIGS. 11 and 12 is used with multiple crystals, the gamma ray window shown in FIG. 12 may be inverted so that the frame members 167 extend between the crystals. The frame members may extend all of the way from the thin windows 161 to the thin glass plate and serve as ports and shields for the crystals and the claddings and mirrors for preventing optical cross-talk.

The gamma ray window 41 shown in FIGS. 11 and 12 may be a metal such as aluminum or any other low absorption metal or material. The frames 167 may be made of a different material than the windows 161. For example, the frame material may have a different material and may form an optical barrier around the windows 161 or their crystals which are associated with the windows.

The frames 167 may extend in opposite directions, both upward and downward, from the windows 161.

Figure 14:
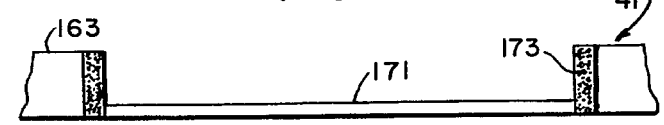
FIG. 14 is an enlarged cross-sectional detail of the thin round, gamma ray window assembly shown in FIG. 13.
Figure 13:
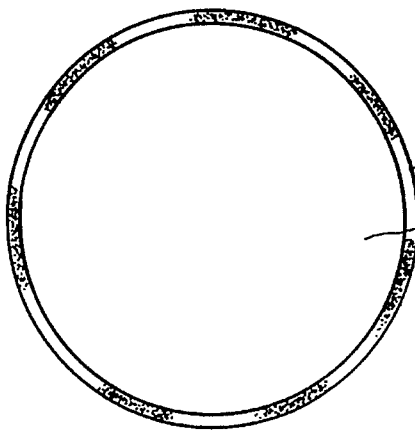
FIG. 13 is a plan view of a round gamma ray window assembly with a thin gamma ray window.

As shown in FIGS. 13 and 14, the gamma ray window 41 for a cylindrical or truncated conical crystal may include a thin circular central portion 171 and a cylindrical frame 173, which may extend outward from the thin window section 171 or which may extend inward around the crystal, which in this case would have a circular crystal plate subassembly.

Figure 15:
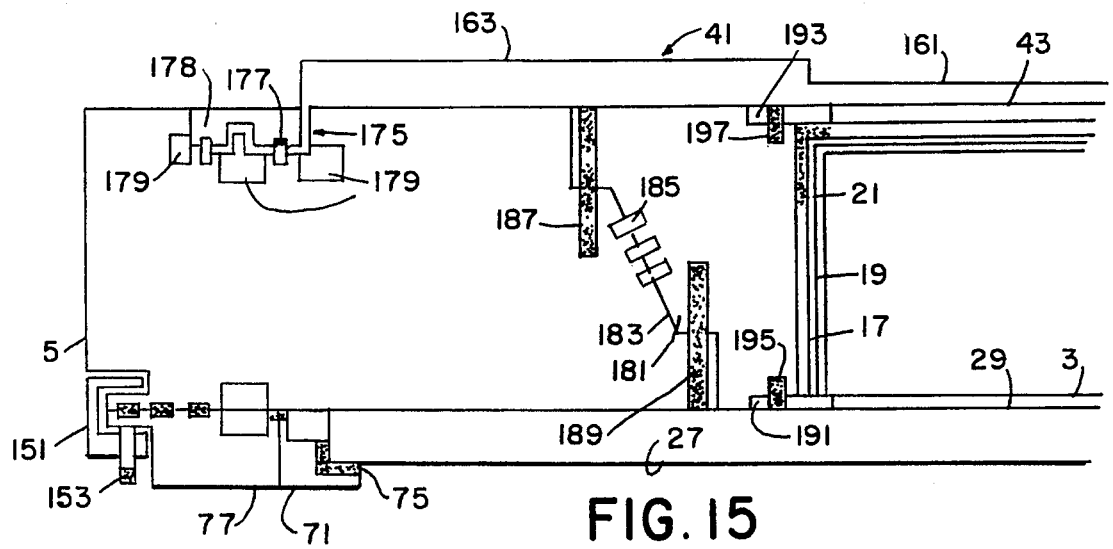
FIG. 15 is an edge view cross-sectional detail of a modular housing for a gamma camera plate assembly having a thin gamma ray window with a housing clamp and elastomer rings for supporting a thin glass plate on the housing, and with screws for mounting the window on the housing, the holder in the housing and the mirror, cladding and crystal in the holder.

As shown in FIG. 15, the window 41 has a thin portion 161 overlying the crystal and a thick mounting portion 163 overlying the housing 5. The window has a mounting portion 175. Two screws 177 connect the mounting portion to the housing 5. Desiccant is deposited in pockets 179 which are outside, between and inside the screws. Epoxy 178 is deposited in a recess and housing above the screws.

A holder 181 is mounted on a sloping wall 183 of the housing. The holder may have one or more of interlocks 185 which extend between the holder and housing, or one or more screws 187 and 189 which connect the holder to the housing. Any of those fasteners is sufficient. The screws can extend through one end or through the entire thickness of the holder. For example, screw 189 may extend throughout the holder and may have a head on its upper end so that it can be unscrewed from the upper end as well as from the lower end.

The crystal 3 is surrounded by the mirror 17 and cladding layers 19 and 21, and lower and upper supports 191 and 193 support the crystal in the holder 181 between the optical couplers 29 and 43. Screws 195 and 197 connect the supports to the holder. The crystal 3 may be removed from the structure after the window is removed by removing screws 197 around the peripheral support which extends around the mirror.

The interlocks 185 may be projections which extend from the housing 5 into complementary recesses in the holder 181 or projections which extend from the holder 181 into complementary recesses in the housing 5, or they may be peg-like interlocks which extend into complementary recesses in both the housing and the holder.

If it is necessary to remove the thin glass plate 27, screws 153 are removed from the encircling clamp 151 and the glass plate subassembly is removed. Then the crystal 3 may be removed by removing the screws 195 and removing the encircling support 191.

Figure 16:
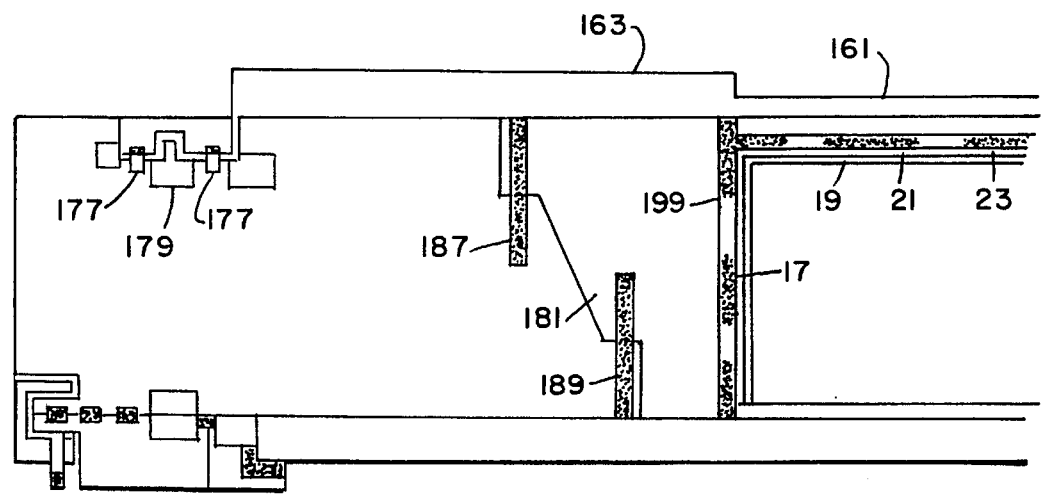
FIG. 16 is similar to FIG. 15 with the absence of interlocks between the housing and holder, and wherein the internal wall of the holder is the mirror.

As shown in FIG. 16, the mirror 17 is actually the polished internal wall 199 of the holder 181, or the mirror 17 is bonded to the interior wall 199.

When screw 187 and screw 189 are removed, the entire holder 181 may be lifted from the housing after the window assembly is removed.

As in FIG. 15, the 189 may be double-headed and may extend entirely through the holder 181.

Figure 17:
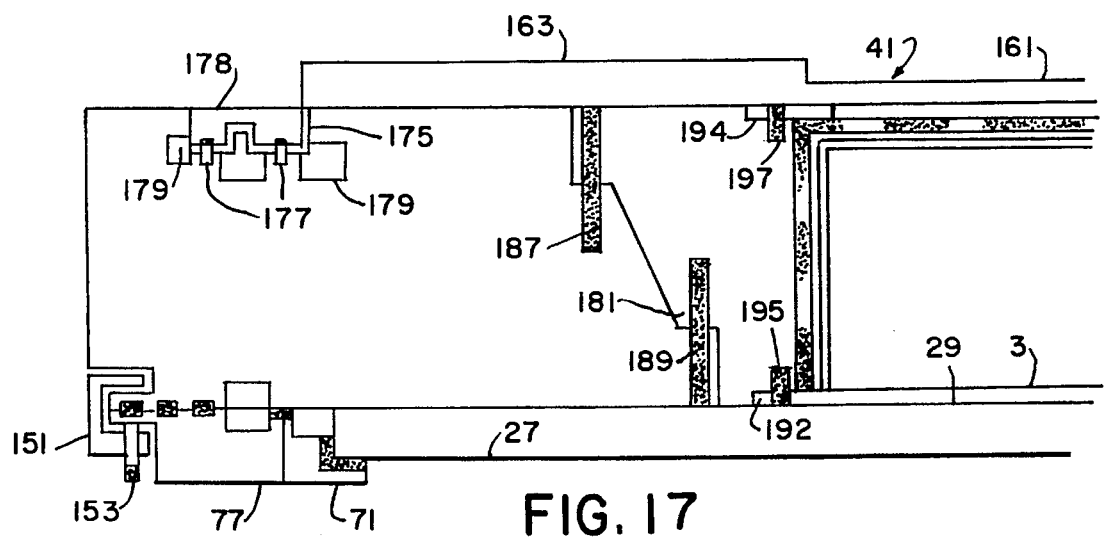
FIG. 17 is similar to FIG. 15 with additional modular support shelves between the crystal and holder.

Referring to FIG. 17, the supports 192 and 194 are shown to extend around the edges of the crystal as well as under and over the mirror and cladding.

As an example, in medical applications the crystal 3 may be made of NaI (Tl doped) and may have a thickness of about ⅜ of an inch or more. The other members of the parts of the housing and seals and clamps are shown schematically for purposes of illustration and are not intended to be optimal size. For example, the clamp shown in FIG. 10 may be much larger or may clamp or may expand, for example, substantially the entire thickness of the housing 5. In other applications crystals may be thicker or thinner depending on the stopping power of the crystal.

The screws or bolts which extend through the housing 5 and hold the assembly in the gamma camera are not shown in the drawings. The housings may be constructed and elements may be varied to provide spaces for fasteners.

The assembly as shown in FIG. 4 may have a single gamma ray window or may have multiple gamma ray windows, such as shown in FIG. 11. The system may have one gamma ray window with multiple separations between the crystals and one glass plate beneath the crystals.

While the invention has been described with reference to specific embodiments, modifications and variations of the invention may be constructed without departing from the scope of the invention, which is defined in the following claims.

I claim:

1. A gamma camera plate assembly comprising a crystal having at least one cladding surrounding the crystal and a mirror surrounding the cladding, and a peripheral crystal housing with a crystal holder mounted between the crystal and the crystal housing for supporting the crystal in the housing, wherein the holder and the housing have mutually engaging surface features for supporting the crystal holder against movement in the crystal housing.

2. The apparatus of claim 1, wherein the mutual engaging features further comprise at least one screw extending between the holder and the housing.

3. The apparatus of claim 1, wherein the mutual engaging features further comprise multiple screws extending between the holder and the housing.

4. The apparatus of claim 1, wherein the cladding and mirror extend around sides of the crystal and not over a top of the crystal.

5. A gamma camera plate assembly comprising a crystal having at least one cladding surrounding the crystal and a mirror surrounding the cladding, and a peripheral housing with a holder mounted between the crystal and the housing for supporting the crystal in the housing, wherein the holder and the housing have mutually engaging surface features for supporting the holder against movement in the housing, wherein the mutually engaging features comprise a downward and inward sloped internal wall in the housing and a complementary upward and outward sloped outer wall on the holder.

6. The apparatus of claim 5, further comprising projections extending transverse to the surfaces for inter-engaging the surfaces and preventing relative sliding of the surfaces.

7. A gamma camera plate assembly comprising a crystal having at least one cladding surrounding the crystal and a mirror surrounding the cladding, and a peripheral housing with a holder mounted between the crystal and the housing for supporting the crystal in the housing, wherein the holder and the housing have mutually engaging surface features for supporting the holder against movement in the housing, wherein the mutually engaging surface features comprise protrusions extending outward from the outer wall of the holder and complementary recesses in the inner wall of the housing.

8. A gamma camera plate assembly comprising a crystal having at least one cladding surrounding the crystal and a mirror surrounding the cladding, and a peripheral housing with a holder mounted between the crystal and the housing for supporting the crystal in the housing, wherein the holder and the housing have mutually engaging surface features for supporting the holder against movement in the housing, wherein the mutually engaging surface features comprise protrusions extending inward from an inner wall of the housing and complementary recesses in an outer wall of the holder for receiving the protrusions and holding the holder against movement within the housing.

9. A gamma camera plate assembly comprising a crystal having at least one cladding surrounding the crystal and a mirror surrounding the cladding, and a peripheral housing with a holder mounted between the crystal and the housing for supporting the crystal in the housing, wherein the holder and the housing have mutually engaging surface features for supporting the holder against movement in the housing, further comprising an inward facing recess in the holder and a complementary outward extension on the mirror for positioning in the inward facing recess in the holder for preventing relative movement of the holder and mirror.

10. A gamma camera plate assembly comprising a crystal having at least one cladding surrounding the crystal and a mirror surrounding the cladding, and a peripheral housing with a holder mounted between the crystal and the housing for supporting the crystal in the housing, wherein the holder and the housing have mutually engaging surface features for supporting the holder against movement in the housing, further comprising an inward extending shelf at the bottom of the holder for extending inward beneath the crystal and supporting the crystal with respect to the holder.

11. A gamma camera plate assembly comprising a crystal having at least one cladding surrounding the crystal and a mirror surrounding the cladding, and a peripheral housing with a holder mounted between the crystal and the housing for supporting the crystal in the housing, wherein the holder and the housing have mutually engaging surface features for supporting the holder against movement in the housing, further comprising an inward extending shelf extending inward from the housing beneath the holder and beneath the crystal for supporting the crystal on the shelf.

12. A gamma camera plate assembly comprising a crystal having at least one cladding surrounding the crystal and a mirror surrounding the cladding, and a peripheral housing with a holder mounted between the crystal and the housing for supporting the crystal in the housing, wherein the holder and the housing have mutually engaging surface features for supporting the holder against movement in the housing, further comprising an inward extending shelf positioned below a peripheral portion of the crystal and extending inward from the housing and holder, and a fastener for connecting the shelf to the holder or housing.

13. A gamma camera plate assembly comprising a crystal having at least one cladding surrounding the crystal and a mirror surrounding the cladding, and a peripheral housing with a holder mounted between the crystal and the housing for supporting the crystal in the housing, wherein the holder and the housing have mutually engaging surface features for supporting the holder against movement in the housing, further comprising a thin glass plate and a connector for connecting a peripheral portion of the thin glass plate to the housing and supporting the thin glass plate from the housing.

14. The apparatus of claim 13, further comprising a glass-to-metal seal or epoxy connecting a peripheral area of the thin glass plate to the housing.

15. The apparatus of claim 14, further comprising an inward cantilevered support connected to an outward portion of the housing and extending inward beneath a peripheral portion of the thin glass plate for supporting the thin glass plate.

16. The apparatus of claim 15, wherein the cantilevered support comprises an annular support extending around the entire peripheral area of the housing, and further comprising a mechanical attachment for mechanically attaching the cantilevered support to the housing.

17. The apparatus of claim 15, further comprising first and second desiccant pockets positioned adjacent the seal and spaced radially inward and radially outward with respect to each other, and desiccant disposed in the pockets for preventing ingress of moisture from without the gamma camera plate assembly and for gettering moisture in the gamma camera plate assembly during fabrication thereof.

18. The apparatus of claim 13, further comprising an L-shaped ring surrounding an edge of the thin glass plate and underlying a peripheral portion of the lower surface of the thin glass plate, and a glass-to-metal seal or epoxy between the peripheral portion and the edge of the thin glass plate and the L-shaped ring for sealing the L-shaped ring to the thin glass plate.

19. The apparatus of claim 18, further comprising an outer ring and epoxy connecting the outer ring to an outer surface of the L-shaped ring, an epoxy connecting the outer ring to an inward facing wall in the housing, a third area of epoxy connecting an upper peripheral surface of the thin glass plate to a lower surface of the housing, and desiccant pockets with desiccant disposed therein between the third area of epoxy in a recess in the housing inward of the third layer of epoxy and between the third layer of epoxy and the glass-to-metal seal or epoxy, and between the first layer of epoxy and the housing.

20. The apparatus of claim 19, further comprising a metal support ring underlying the outer ring, the second layer of epoxy and the housing, and mechanically attached to the housing for supporting the outer ring and thereby supporting the L-shaped ring and the thin glass plate on the housing.

21. The apparatus of claim 13, further comprising a thin ring on the connector spaced from the glass plate and extending from the connector, a thin ring on the housing adjacent the thin ring on the connector, the thin rings being juxtaposed and joined.

22. The apparatus of claim 13, further comprising recesses formed between the connector and the housing and deformable sealing rings in the recesses for compressing in the recesses and sealing the connector and housing.

23. A gamma camera plate assembly comprising a crystal having at least one cladding surrounding the crystal and a mirror surrounding the cladding, and a peripheral housing with a holder mounted between the crystal and the housing for supporting the crystal in the housing, wherein the holder and the housing have mutually engaging surface features for supporting the holder against movement in the housing, wherein the mutual engaging features further comprise multiple screws extending between the holder and the housing, further comprising interlocks extending between the holder and the housing.

24. A gamma camera plate assembly comprising a crystal having at least one cladding surrounding the crystal and a mirror surrounding the cladding, and a peripheral housing with a holder mounted between the crystal and the housing for supporting the crystal in the housing, wherein the holder and the housing have mutually engaging surface features for supporting the holder against movement in the housing, wherein the mirror is fixed to the inner surface of the holder.

25. A gamma camera plate assembly comprising a crystal having at least one cladding surrounding the crystal and a mirror surrounding the cladding, and a peripheral housing with a holder mounted between the crystal and the housing for supporting the crystal in the housing, wherein the holder and the housing have mutually engaging surface features for supporting the holder against movement in the housing, wherein the mutually engaging features comprise a support extending beneath the mirror and the cladding.

26. The apparatus of claim 25, further comprising an upper support extending over the sides of the mirrors and cladding, and screws connecting the upper support to the holder.

27. The apparatus of claim 25, wherein the support extends under a peripheral surface portion of the crystal, and further comprising an upper support extending over sides of the mirror and the cladding and over a peripheral upper surface portion of the crystal, and screws connecting the upper support to the holder.

28. A gamma camera plate assembly comprising a crystal having at least one cladding surrounding the crystal and a mirror surrounding the cladding, and a peripheral housing with a holder mounted between the crystal and the housing, an inward extending shelf at the bottom of the holder for extending inward beneath the crystal and supporting the crystal with respect to the holder, for supporting the crystal in the housing.

29. The apparatus of claim 28, wherein the inward extends shelf extending inward from the housing beneath the holder and beneath the crystal for supporting the crystal on the shelf.

30. The apparatus of claim 28, wherein the an inward extending shelf is positioned below a peripheral portion of the crystal and extends inward from the housing and holder, and further comprising a fastener for connecting the shelf to the holder or the housing.

31. A gamma camera plate assembly comprising a crystal having at least one cladding surrounding the crystal and a mirror surrounding the cladding, and a peripheral housing with a holder for supporting the crystal in the housing, a thin glass plate and a connector for connecting a peripheral portion of the thin glass plate to the housing and supporting the thin glass plate from the housing.

32. The apparatus of claim 31, further comprising a glass-to-metal seal or epoxy connecting a peripheral area of the thin glass plate to the housing.

33. The apparatus of claim 32, further comprising an inward cantilevered support connected to an outward portion of the housing and extending inward beneath a peripheral portion of the thin glass plate for supporting the thin glass plate.

34. The apparatus of claim 33, wherein the cantilevered support comprises an annular support extending around an entire peripheral area of the housing, and further comprising a mechanical attachment for mechanically attaching the cantilevered support to the housing.

35. The apparatus of claim 31, further comprising an L-shaped ring surrounding an edge of the thin glass plate and underlying a peripheral portion of the lower surface of the thin glass plate, and a glass-to-metal seal or epoxy between the peripheral portion and the edge of the thin glass plate and the L-shaped ring for sealing the L-shaped ring to the thin glass plate.

36. The apparatus of claim 35, further comprising an outer ring and epoxy connecting the outer ring to an outer surface of the L-shaped ring, epoxy connecting the outer ring to an inward facing wall in the housing, a third area of epoxy connecting an upper peripheral surface of the thin glass plate to a lower surface of the housing, and desiccant pockets with desiccant disposed therein at opposite edges of the third area of epoxy.

37. The apparatus of claim 36, further comprising a metal support ring underlying the outer ring, the second layer of epoxy and the housing, and mechanically attached to the housing for supporting the outer ring and thereby supporting the L-shaped ring and the thin glass plate on the housing.

38. A gamma camera plate assembly comprising a crystal having at least one cladding surrounding the crystal and a mirror surrounding the cladding, and a peripheral housing for supporting the crystal in the housing, and a variable thickness gamma ray window mounted over the crystal with a relatively thin portion of the window above the crystal and a relatively thick portion of the window extending over the housing for sealing to the housing.

39. A gamma camera plate assembly comprising a crystal having at least one cladding surrounding the crystal and a mirror surrounding the cladding, and a peripheral housing for supporting the crystal in the housing, and a variable thickness gamma ray window mounted over the crystal with a relatively thin portion of the window above the crystal and a relatively thick portion of the window extending over the housing for sealing to the housing, wherein the gamma ray window comprises a frame having a relatively thin dimension in a direction parallel to a plane of the window and having a relatively thick dimension transverse to the plane of the window.

40. The apparatus of claim 39, wherein the frame extends from the window in opposite directions.

41. The apparatus of claim 39, wherein the frame extends in a direction away from the crystal.

42. The apparatus of claim 39, wherein the frame extends in a direction towards the crystal.

43. The apparatus of claim 39, further comprising multiple laterally arranged crystals, and wherein the window comprises multiple thin window apertures surrounded by frame members, each window aperture overlying a crystal.

44. The apparatus of claim 43, wherein the frame members extend from the window between the multiple crystals.

45. The apparatus of claim 44, wherein the frame members extend to a thin glass plate beneath the multiple crystals.

* * * * *